(12) United States Patent
Cao et al.

(10) Patent No.: US 10,956,991 B2
(45) Date of Patent: Mar. 23, 2021

(54) SYSTEMS AND METHODS FOR ENHANCING INTERACTIONS IN A COMPUTER NETWORKING ENVIRONMENT

(71) Applicant: Facebook, Inc., Menlo Park, CA (US)

(72) Inventors: Shiqi Cao, Redwood City, CA (US); Zhonghu Gao, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 235 days.

(21) Appl. No.: 15/858,812

(22) Filed: Dec. 29, 2017

(65) Prior Publication Data

US 2019/0205997 A1    Jul. 4, 2019

(51) Int. Cl.
| | | |
|---|---|---|
| *G06Q 10/10* | (2012.01) | |
| *G06Q 10/06* | (2012.01) | |
| *G06Q 30/02* | (2012.01) | |
| *G06Q 50/00* | (2012.01) | |
| *G06N 20/00* | (2019.01) | |

(52) U.S. Cl.
CPC ............ *G06Q 50/01* (2013.01); *G06N 20/00* (2019.01); *G06Q 10/1093* (2013.01)

(58) Field of Classification Search
CPC ..... G06Q 50/01; G06Q 10/1093; G06N 20/00
USPC .................................................. 705/1.1, 319
See application file for complete search history.

(56) References Cited

U.S. PATENT DOCUMENTS

| | | | | |
|---|---|---|---|---|
| 2009/0222551 | A1* | 9/2009 | Neely | .................. G06F 16/951 |
| | | | | 709/224 |
| 2013/0275164 | A1* | 10/2013 | Gruber | .................... G10L 17/22 |
| | | | | 705/5 |
| 2016/0098701 | A1* | 4/2016 | Harris | ................ G06Q 20/3223 |
| | | | | 705/14.64 |
| 2017/0004588 | A1* | 1/2017 | Isaacson | ............. G06Q 20/065 |
| 2018/0089585 | A1* | 3/2018 | Rickard, Jr. | ..... G06Q 10/06375 |

\* cited by examiner

*Primary Examiner* — Jonathan P Ouellette
(74) *Attorney, Agent, or Firm* — Sheppard Mullin Richter & Hampton LLP

(57) ABSTRACT

Systems, methods, and non-transitory computer readable media can determine an interaction involving a user and an entity based on selection of a call to action (CTA). One or more follow up actions can be determined. Presentation of an option for selecting the one or more follow up actions can be caused.

20 Claims, 9 Drawing Sheets

500

```
┌─────────────────────────────────────────────────────────────────────┐
│ Determine an interaction involving a user and an entity based on   │
│ selection of a call to action (CTA)                                 │
│ 502                                                                 │
└─────────────────────────────────────────────────────────────────────┘
                                    │
                                    ▼
┌─────────────────────────────────────────────────────────────────────┐
│ Determine one or more follow up actions                             │
│ 504                                                                 │
└─────────────────────────────────────────────────────────────────────┘
                                    │
                                    ▼
┌─────────────────────────────────────────────────────────────────────┐
│ Cause presentation of an option for selecting the one or more      │
│ follow up actions                                                   │
│ 506                                                                 │
└─────────────────────────────────────────────────────────────────────┘
```

FIGURE 5A

SYSTEMS AND METHODS FOR ENHANCING INTERACTIONS IN A COMPUTER NETWORKING ENVIRONMENT

FIELD OF THE INVENTION

The present technology relates to a computer networking environment. More particularly, the present technology relates to enhancing interactions in a social networking system.

BACKGROUND

People often utilize computing devices or systems for a wide variety of purposes. Users can use their computing devices, for example, to interact with one another, create content, share content, and view content. In some cases, a user can utilize his or her computing device to access a social networking system or service. The user can provide, post, share, and access various content items, such as status updates, images, videos, articles, and links, via the social networking system.

Various entities can be represented on the social networking system. For example, the social networking system may provide pages for entities. Pages can be dedicated locations on the social networking system to reflect the presence of entities on the social networking system. Examples of entities can include companies, businesses, brands, products, artists, public figures, entertainment, individuals, etc. Users of the social networking system can interact with entities through pages associated with the entities.

SUMMARY

Various embodiments of the present technology can include systems, methods, and non-transitory computer readable media configured to determine an interaction involving a user and an entity based on selection of a call to action (CTA). One or more follow up actions can be determined. Presentation of an option for selecting the one or more follow up actions can be caused.

In some embodiments, the selection of the CTA is performed through a social networking system and the interaction is performed external to the social networking system.

In some embodiments, the interaction is a phone call made by the user to the entity.

In some embodiments, the interaction involves a transaction between the user and the entity.

In some embodiments, a transaction associated with the interaction is determined based at least in part on a feature of the interaction.

In some embodiments, the one or more follow up actions are performed in response to selection of the one or more follow up actions.

In some embodiments, the interaction is a phone call from the user to the entity, the feature of the interaction is a time duration of the phone call, and the one or more follow up actions relates to a calendar reminder.

In some embodiments, the determining a transaction is based on a machine learning model.

In some embodiments, the determining the one or more follow up actions is based on a machine learning model.

In some embodiments, the option for selecting the one or more follow up actions is presented through a first application and information relating to the one or more follow up actions is presented through a second application.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5A illustrates an example first method, according to an embodiment of the present technology.

Figure 1:
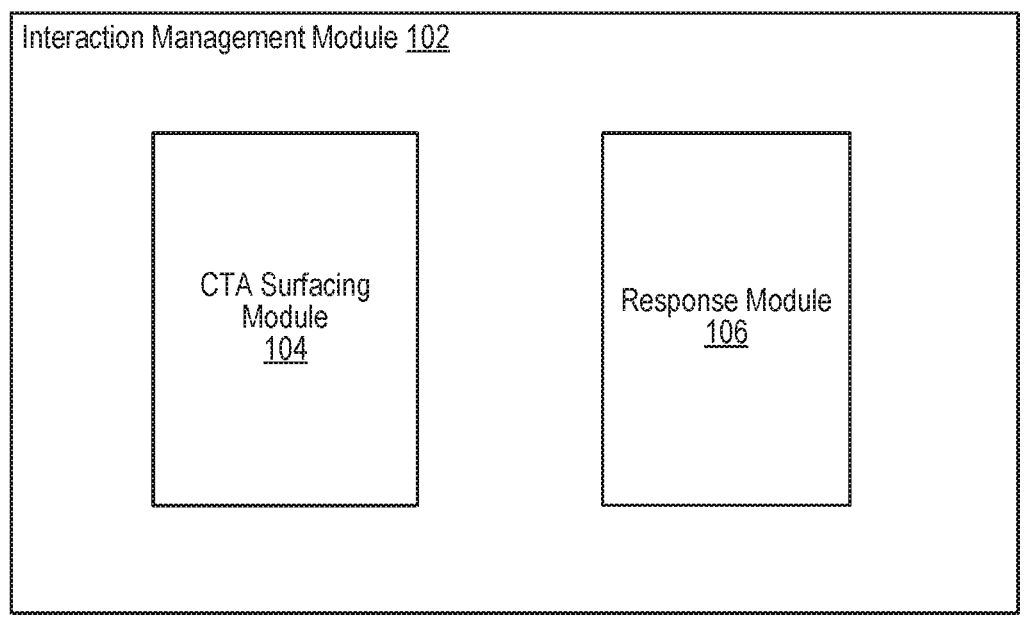
FIG. 1 illustrates an example system including an example interaction management module, according to an embodiment of the present technology.
Figure 1:
Figure 1:
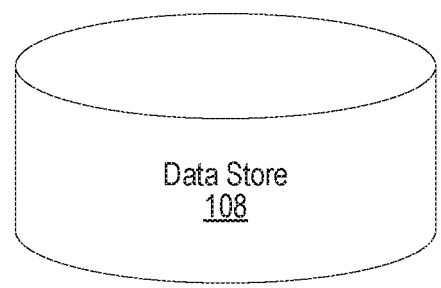

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Enhancing Interactions Involving Users and Pages of a Social Networking System People often utilize computing devices or systems for a wide variety of purposes. Users can use their computing devices, for example, to interact with one another, create content, share content, and view content. In some cases, a user can utilize his or her computing device to access a social networking system or service. The user can provide, post, share, and access various content items, such as status updates, images, videos, articles, and links, via the social networking system.

Various entities can be represented on the social networking system. For example, the social networking system may provide pages for entities. Pages can be dedicated locations on the social networking system to reflect the presence of entities on the social networking system. Examples of entities can include companies, businesses, brands, products, artists, public figures, entertainment, individuals, etc. Users of the social networking system can interact with entities through pages associated with the entities.

Conventional approaches specifically arising in the realm of computer technology can involve various types of interactions between users and entities in an online platform or environment, such as a social networking system. Some interactions, which may be associated with a transaction between a user and an entity, can be conducted or supported by the online platform. After completion of an interaction, provision of further information or further action relating to the interaction by the online platform could be helpful to the user or the entity. However, conventional techniques can fail to provide such information or action. As a result, user experience in relation to interactions performed through an online platform can be suboptimal.

An improved approach rooted in computer technology can overcome the foregoing and other disadvantages associated with conventional approaches specifically arising in the realm of computer technology. Based on computer technology, the present technology can determine an occurrence of an interaction between a user and an entity. In some cases, the entity can be represented as a page on a social networking system. A type of the interaction can be determined and confirmed. Based on the type of the interaction, follow up actions can be suggested for the user or the entity. One or more machine learning models can be used to determine the type of the interaction and to identify relevant follow up actions. As just one example, a call to action (CTA) that invites a user to call a page can be presented to the user. After occurrence of an interaction in which the user selected the CTA and completed a phone call to the page, a determination can be generated about the interaction. For example, the determination can indicate that the user performed a transaction during the phone call, such as setting an appointment with the page. A request to confirm the determination about the setting of an appointment can be provided to the user. Upon confirmation, one or more follow up actions can be suggested for the user based on a type of the confirmed interaction. For example, a follow up action can relate to creation of a calendar reminder for the appointment. In this example, if the user selects the follow up action relating to creation of the calendar reminder, the user can be prompted to provide a date and time of the appointment. As a result, the user will be provided with a calendar reminder about the appointment at a selected time before the date and time of the appointment. The calendar reminder can be provided through various surfaces, such as a messaging application of the user. An administrator of the page involved with the appointment also can be provided with a calendar reminder. Different follow up actions can be suggested based on the type of interaction that is determined. Additional details relating to the present technology are provided below.

FIG. 1 illustrates an example system 100 to suggest follow up actions in response to an interaction between a user and an entity, according to an embodiment of the present technology. The system 100 can determine an occurrence of an interaction between a user and an entity. As used herein, an entity can include any type of entity, such as a business, company, brand, service, product, public figure, individual, etc. In some embodiments, an interaction between a user and an entity can occur in whole or in part through an online platform or environment, such as a social networking system through which the entity is represented by a dedicated page. In some embodiments, an interaction between a user and an entity can occur outside of or external to the social networking system. The system 100 can generate a determination regarding a type of an interaction between a user and an entity. The determination can be provided to the user for confirmation. Based on the type of the interaction, the system 100 can suggest follow up actions for the user, the page, or both. One or more of the follow up actions can be selected to enhance user experience relating to the interaction.

While interactions are sometimes discussed herein as being initiated by calls to action (CTAs), the present technology also applies to interactions initiated in other manners. Further, while interactions involving a user and an entity are sometimes discussed herein as being initiated or occurring through a page of the entity in a social networking system, the present technology applies equally to interactions initiated or occurring through other surfaces and applications. For example, the present technology applies to interactions between a user and an entity on a messaging application or other type of application. Further, while the disclosed technology is sometimes described in connection with a computerized social networking system for illustrative purposes, the disclosed technology can apply to any other type of online or networked system, or any type of interaction or transaction management platform.

The system 100 includes an interaction management module 102. The Interaction management module 102 can include a CTA surfacing module 104 and a response module 106. The components (e.g., modules, sub-modules, elements, steps, blocks, data stores, etc.) shown in this figure and all figures herein are exemplary only, and other implementations may include additional, fewer, integrated, or different components. Some components may not be shown so as not to obscure relevant details. In various embodiments, one or more of the functionalities described in connection with the interaction management module 102 can be implemented in any suitable combinations.

The CTA surfacing module 104 can provide invitations for interaction, such as CTAs, between a user and an entity. As indicated, an entity can be represented as a page in a social networking system. One or more CTAs can be presented by a page for selection by a user. In some embodiments, the CTA surfacing module 104 can allow an administrator of a page to specify CTAs to be presented to a user through the page. In some embodiments, the CTA surfacing module 104 can recommend CTAs for presentation by a page to a user. For example, CTAs can be recommended for a page based on various factors, such as an industry, industry segment, industry vertical, or other category associated with the page. For example, the CTA surfacing module 104 can recommend CTAs for a page that are relevant to a restaurant when an entity associated with the page falls within a restaurant category. CTAs also can be recommended for a page based on other factors, such as an interaction history of the page, interaction histories of users who access the page, etc. Examples of types of CTAs can include "call now," "shop now," "book now," "make a reservation," "buy tickets," "contact us," "learn more," "get directions," "purchase," "order," etc. Selection by a user of a CTA can indicate an intent by the user to engage in or perform an interaction that corresponds or relates to the selected CTA.

The response module 106 can determine selection of a CTA by a user. The response module 106 can determine a type of interaction engaged in or performed by the user and an entity in response to selection of the CTA. Based on the determination of the type of interaction, the CTA response module 106 can provide a suggestion for the user (or the entity) to take one or more follow up actions. More details regarding the response module 106 are provided herein.

The data store 108 can be configured to store and maintain various types of data, such as the data relating to support of and operation of the interaction management module 102. The data maintained by the data store 108 can include, for example, CTAs, interactions, transactions, follow up actions, mappings between interactions and transactions with follow up actions, machine learning models, training data for the machine learning models, etc. The data store 108 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. In some embodiments, the data store 108 can be a data store of a server system in communication with a user device.

In some embodiments, the interaction management module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the interaction management module 102 can be, in part or in whole, implemented as software running on one or more computing devices or systems, such as on a server system, a client computing device, or both. In some instances, the interaction management module 102 can be, in part or in whole, implemented within or configured to operate in conjunction or be integrated with a social networking system (or service), such as a social networking system 630 of FIG. 6. Likewise, in some instances, the interaction management module 102 can be, in part or in whole, implemented within or configured to operate in conjunction or be integrated with a client computing device, such as the user device 610 of FIG. 6. For example, the interaction management module 102, in whole or in part, can be implemented as or within a dedicated application (e.g., app), a program, or an applet running on a client computing device. The application incorporating or implementing instructions for performing functionality of the interaction management module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

Figure 2:
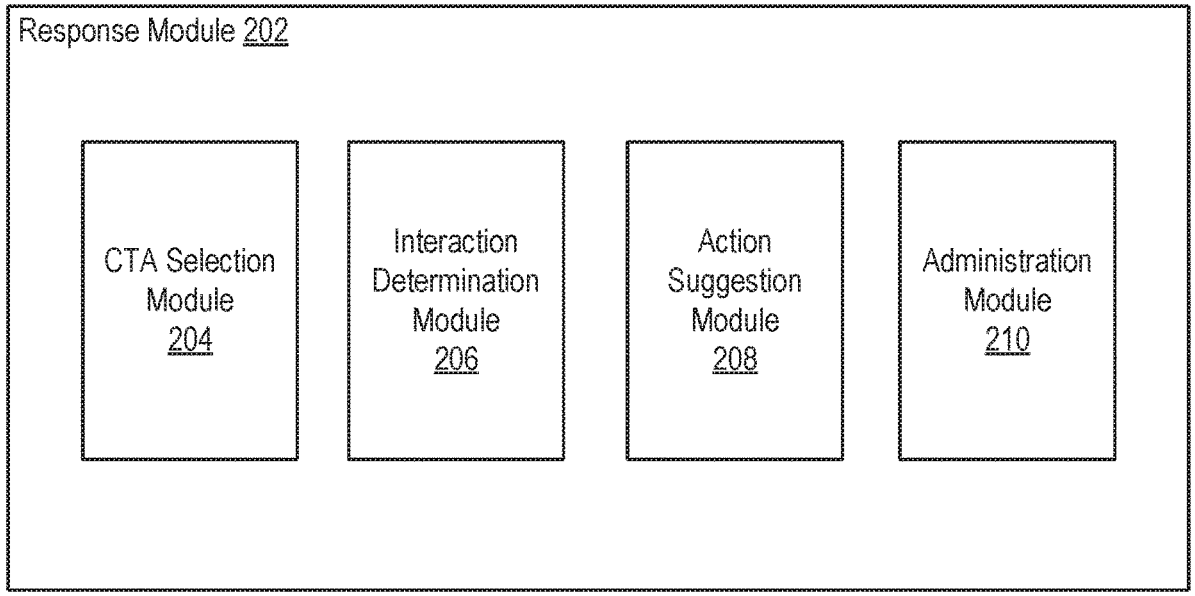
FIG. 2 illustrates an example response module, according to an embodiment of the present technology.

FIG. 2 illustrates an example response module 202 configured to determine follow up actions in response to an interaction between a user and an entity, according to an embodiment of the present technology. In some embodiments, the response module 106 of FIG. 1 can be implemented with the response module 202. As shown in the example of FIG. 2, the response module 202 can include a CTA selection module 204, an interaction determination module 206, an action suggestion module 208, and an administration module 210.

The CTA selection module 204 can support selection of a CTA. As mentioned, an entity can be represented as a page in a social networking system, and one or more CTAs can be presented by the page for selection by a user. The CTAs can be presented through an interface of an application running on a user device of the user. For example, each CTA can be implemented as an interface element presented through the interface for potential selection by the user. The CTA selection module 204 can determine a CTA selected by a user. Engagement (e.g., a touch gesture) by the user with an interface element corresponding to a CTA can indicate that the user intends to engage in or perform an interaction in relation to the page. The interaction can be associated with a type of the selected CTA. The CTA selection module 204 can support performance of the interaction. For example, if a page is associated with an entity that runs a business, the page can present a "call now" CTA. In this example, based on selection by the user of the "call now" CTA, the CTA selection module 204 can prompt an application on a user device to allow the user to initiate a phone call to the business. Such prompting can cause a dial screen to appear on the user device to allow the user to call the business. As another example, if a page is associated with an entity that runs a movie theater business, the page can present a "buy tickets" CTA, a "get directions" CTA, or other relevant CTA. In this example, based on selection by the user of the "buy tickets" CTA or the "get directions" CTA, the CTA selection module 204 can initiate and support an online interaction between the user and the page to allow the user to buy tickets offered by the page or to obtain directions to a business establishment of the page.

The interaction determination module 206 can determine a type of interaction that was engaged in or performed after selection of a CTA. In some embodiments, a type of an interaction can be determined in general based on a type of a CTA selected by a user in connection with a page or associated entity. For example, if it is determined that the user selected a "call now" CTA, the interaction determination module 206 can determine that the user performed an interaction relating to making a phone call to the entity associated with the page. As another example, if it is determined that the user selected a "book now" CTA, the interaction determination module 206 can determine that the user performed an interaction relating to creation of a reservation with entity associated with the page. As yet another example, if it is determined that the user selected a "purchase" CTA, the interaction determination module 206 can determine that the user performed an interaction relating to purchase of a good or service offered by the entity associated with the page.

The interaction determination module 206 can determine more detailed information about an interaction between a user and an entity. In some embodiments, the interaction determination module 206 can generate determinations regarding what particular event(s) may have occurred during, as a result of, or otherwise in association with the interaction. An event can include a transaction, such as, for example, booking an appointment, purchasing tickets, making a reservation, etc. The interaction determination module 206 can generate such determinations where an interaction that occurred in response to selection of a CTA potentially involves one or more possible transactions. The interaction determination module 206 also can generate such determinations where an interaction or associated transaction performed in response to selection of a CTA occurs apart from or external to an online platform (e.g., a social networking system) that presented the CTA. Such an interaction or transaction can be considered an off-platform interaction or transaction. For example, if a "call now" CTA is presented through a social networking system on a page for potential selection by a user, but a resulting phone call by the user to the page is performed by a separate resource or application independent of the social networking system, the phone call can be considered an off-platform interaction or transaction.

The interaction determination module 206 can determine transaction(s) associated with an interaction. In some embodiments, the interaction determination module 206 can determine particular transactions associated with an interaction based on machine learning models. A machine learning model can be trained to determine one or more transactions potentially associated with an interaction. The machine learning model can generate a score for each transaction that indicates a likelihood that the transaction was actually performed. The transactions can be sorted and ranked based on their scores. The interaction determination module 206 can identify a threshold number of highest ranked transactions or transactions associated with scores that satisfy a threshold value. The identified transaction(s) can be designated as transaction(s) associated with the interaction that were performed. The machine learning model can be trained with various training data. Such training data can include, for example, features relating to user attributes, user activity attributes, page attributes, and page activity attributes as well as corresponding labels indicating performed transactions. The training data also can include features relating to information about interactions that occurred and labels indicating transactions that were performed. For example, when an interaction relates to a phone call by a user to a page after selection of a "call now" CTA, the training data can include a time duration of the phone call as feature data and a corresponding label indicating a transaction that was performed during the phone call. In this example, a machine learning model can be trained to determine what kind of transaction was performed during a phone call based at least in part on a time duration of the phone call. Many variations are possible.

In some embodiments, the interaction determination module 206 can provide the determined transactions to a user for confirmation. When a score relating to a determined transaction satisfies a threshold value, the interaction determination module 206 can determine that the transaction occurred with a high level of confidence. The interaction determination module 206 then can provide to a user a request to confirm that the transaction, in fact, did occur. The indication can be presented through an interface of an application running on a user device of the user. Depending on a response to the request to confirm, the interaction determination module 206 can determine whether the transaction occurred. If the response to the request is affirmative, the interaction determination module 206 can determine that the transaction occurred. If the response to the request is negative, the interaction determination module 206 can determine that the transaction did not occur. In some cases, the response to the request and feature data relating to the transaction can be used as training data to retrain a machine learning model for determining transactions.

The action suggestion module 208 can suggest follow up actions to interactions or transactions. The follow up actions can provide information or facilitate performance of activities that are helpful or needed in relation to a corresponding interaction or transaction. Based on a determined occurrence of an interaction or a transaction, the action suggestion module 208 can suggest follow up actions for a user relating to the interaction or the transaction. In some embodiments, the action suggestion module 208 can associate a type of the interaction or the transaction with certain follow up actions. Accordingly, the action suggestion module 208 can determine follow up actions for an interaction or a transaction based on the type of the interaction or the transaction. For example, the action suggestion module 208 can associate a transaction relating to booking an appointment with a page of a business during a phone call with a follow up action relating to providing information about the business, such as navigation directions to the business, a review of the business, a list of offerings of the business, etc. In this example, the action suggestion module 208 accordingly can determine a follow up action relating to providing the information about the business in response to a determination of a transaction relating to booking an appointment. As another example, the action suggestion module 208 can associate a transaction relating to booking an appointment with a page of a business during a phone call with a follow up action relating to scheduling a calendar reminder about the appointment. In this example, the action suggestion module 208 accordingly can determine a follow up action relating to scheduling the calendar reminder about the appointment in response to a determination of a transaction relating to booking the appointment. As yet another example, the action suggestion module 208 can associate a transaction relating to booking by a user of an appointment with a page of a business during a phone call with a follow up action relating to creating an event about the appointment and sharing the event with connections of the user over a social networking system to invite their participation. In this example, the action suggestion module 208 accordingly can determine a follow up action relating to creating and sharing the event about the appointment in response to a determination of a transaction relating to booking the appointment. As yet still another example, the action suggestion module 208 can associate an interaction relating to expression of an intent by a user to obtain information about a page of a business with a follow up action relating to connecting the user and the business through a messaging application so that the user can obtain information from and otherwise communicate with the business. In this example, the action suggestion module 208 accordingly can determine a follow up action relating to connecting the user and the business through the messaging application in response to a determination of an interaction relating to the expression of intent by the user to obtain information about the business. Many variations are possible. Communications between the user and the business through the messaging application can include exchanges of various types of information, such as questions, replies, observations, invoices, etc.

In some embodiments, the action suggestion module 208 can determine particular follow up actions for interactions or transactions based on machine learning models. A machine learning model can be trained to determine one or more potential follow up actions in response to a determined interaction or transaction. The machine learning model can generate a score for each follow up action that indicates a likelihood that a user will select the follow up action. The scores corresponding to the follow up actions can be sorted and ranked. The action suggestion module 208 can identify a threshold number of highest ranked follow up actions or follow up actions associated with scores that satisfy a threshold value. The identified follow up actions can be designated as follow up actions for presentation to the user.

The machine learning model can be trained with various training data. Such training data can include, for example, features relating to interaction attributes, transaction attributes, user attributes, user activity attributes, page attributes, and page activity attributes as well as labels indicating chosen follow up actions. In various embodiments, one or more machine learning models discussed in connection with the interaction management module 102 and its submodules, such as the interaction determination module 206 and the action suggestion module 208, can be implemented separately or in combination, for example, as a single machine learning model, as multiple machine learning models, as one or more staged machine learning models, as one or more combined machine learning models, etc.

The action suggestion module 208 can present one or more follow up actions to a user. The follow up actions can be presented through an interface of an application running on a user device of the user. In some embodiments, the follow up actions can be presented for selection by the user. Upon selection of a follow up action of a certain type, the action suggestion module 208 can provide information to the user. For example, if the selected follow up action relates to providing information about a business associated with a page, information provided to the user can include navigation directions to the business, a review of the business, or a list of offerings of the business. In addition, upon selection of a follow up action of another type, the action suggestion module 208 can prompt the user to provide information or preferences regarding the follow up action. The action suggestion module 208 then can take action based on the information and preferences. For example, if the follow up action relates to scheduling a calendar reminder, the follow up action may present an interface element through which the user can provide a time, date, and other details regarding the appointment. The action suggestion module 208 can receive the details regarding the appointment and create a calendar reminder for the appointment that is sent to the user at a selected time period prior to the time and date of the appointment.

In some embodiments, the action suggestion module 208 can provide information relating to a follow up action through a surface that is the same as the surface through which the interaction or transaction was engaged in or performed. The information relating to a follow up action can be, for example, information that constitutes a part or whole of the follow up action or information that relates to or is supportive of performance of the follow up action. For example, if a user engages in or performs an interaction or a transaction through an application associated with a social networking system, the information relating to a follow up action likewise can be presented to the user through the application associated with the social networking system. In some embodiments, the action suggestion module 208 can provide information relating to a follow up action through a surface that is the different from the surface through which the interaction or transaction occurred. For example, if a user performs an interaction or a transaction through one application, such as a social networking system application or an application associated with phone calling, the information relating to a follow up action can be presented to the user through a different application, such as an application associated with messaging functionality. In this example, the social networking system application can interface and communicate with the messaging application to deliver the information relating to the follow up action and enable performance of the follow up action, such as scheduling a calendar reminder on the messaging application.

The administration module 208 also can provide information relating to interactions and transactions to an administrator of a page with which a user has interacted as well as an administrator of a social networking system. The administration module 208 can provide management tools that assist an administrator of a page to manage and track interactions and transactions. The management tools can provide functionality allowing the administrator to monitor the number, date and time, and type of interactions and transactions engaged in or performed with the page as well as data relating to users who engaged in or performed the interactions and transactions. In addition, the administration module 208 can take action to support an administrator of a page in relation to a selected follow up action. For instance, when a follow up action is selected that relates to creating a calendar reminder for a user regarding booking an appointment with a page, the administration module 208 can create a calendar reminder for an administrator of the page. The administration module 208 also can track data relating to activities of users to support an administrator of a social networking system. The administration module 208 can identify users who actively engage in or perform interactions or transactions with pages, or participate in follow up actions. Based on the identification of such users, the administration module 208 can determine individuals who can be more likely to take action on the social networking system or take action with the pages in particular. Such users can be desirable candidates to target in advertising campaigns delivered through the social networking system by the pages or others.

Figure 3A:
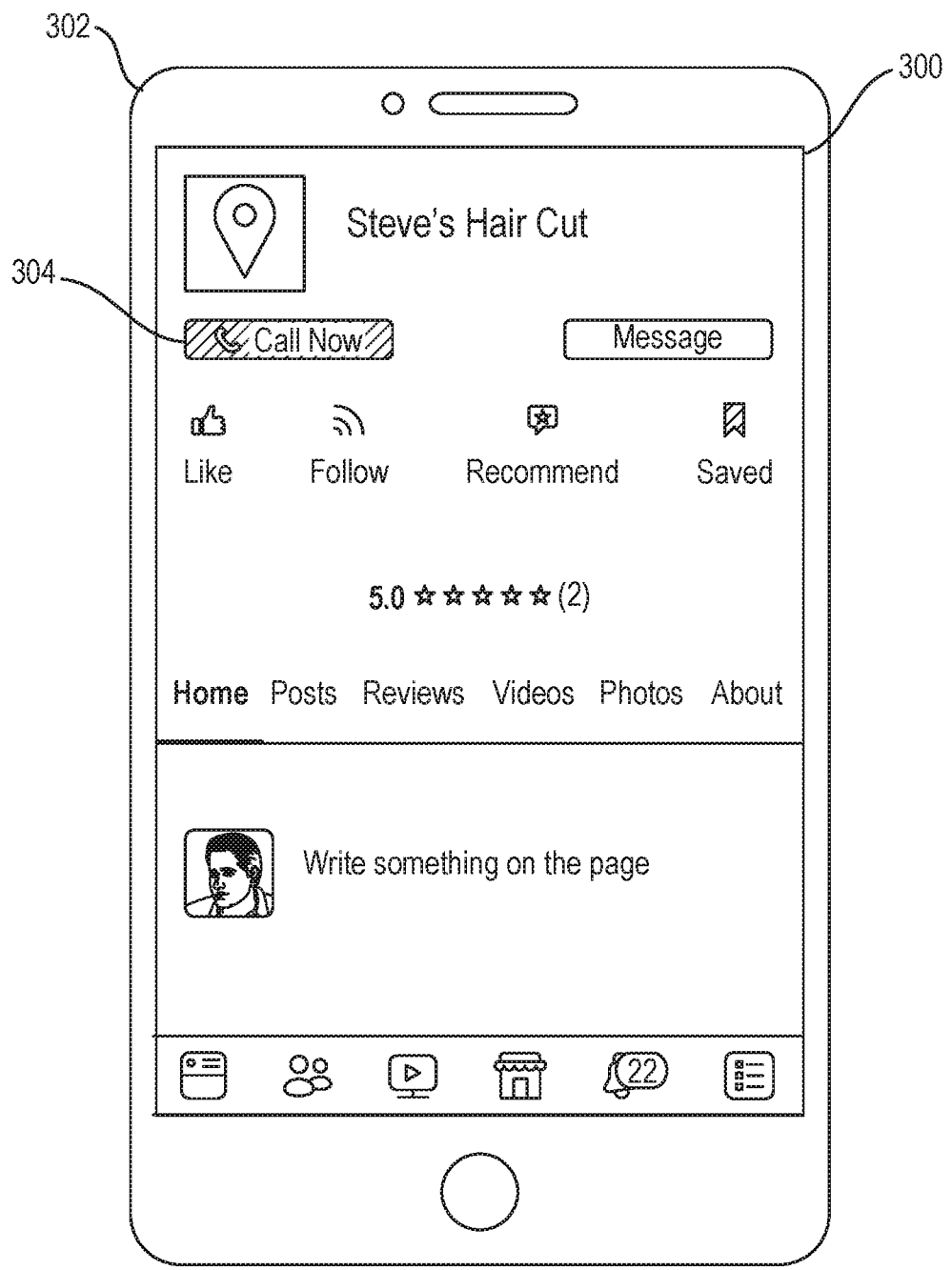
FIGS. 3A-4 illustrate example interfaces, according to embodiments of the present technology.
Figure 3B:
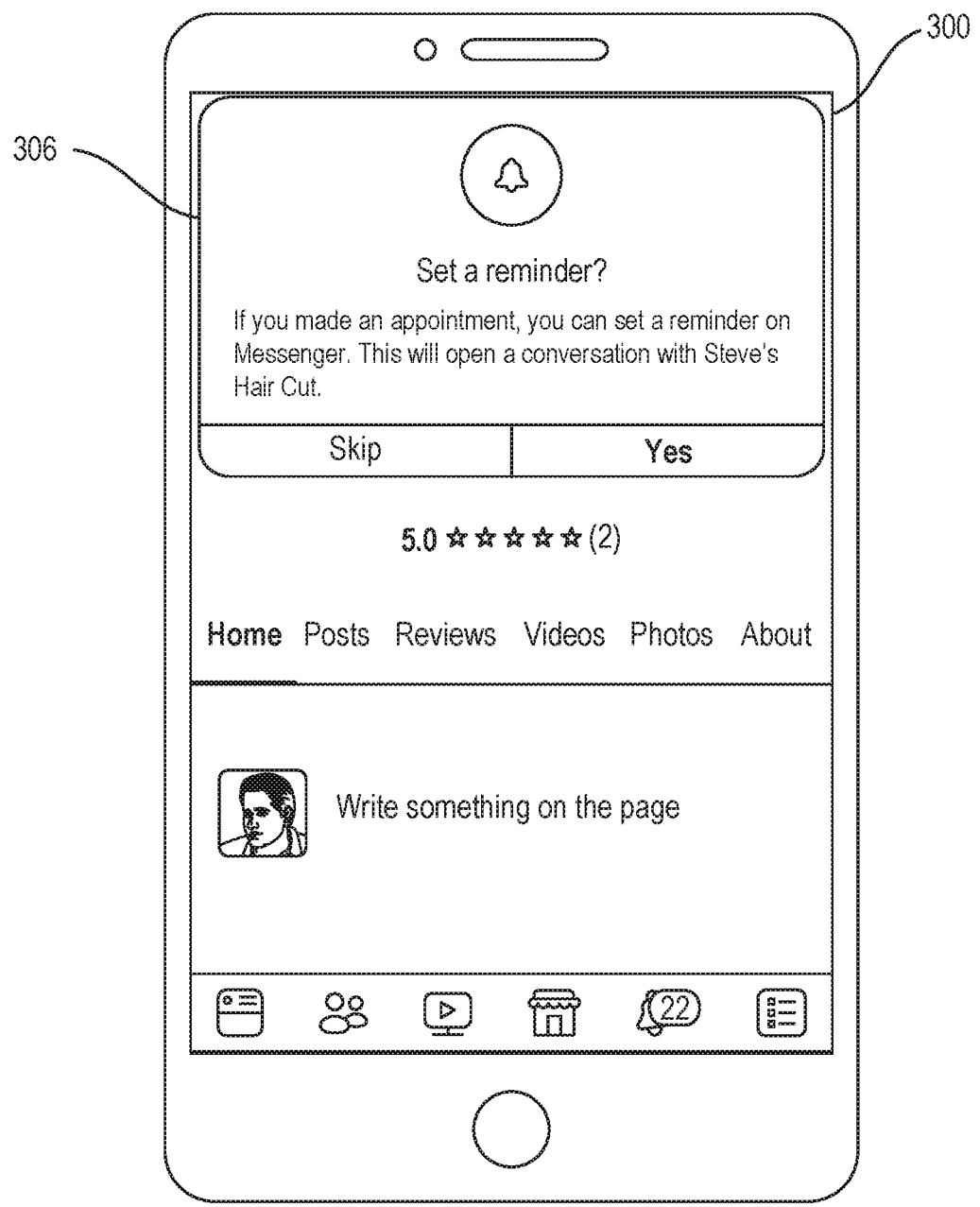
Figure 4:
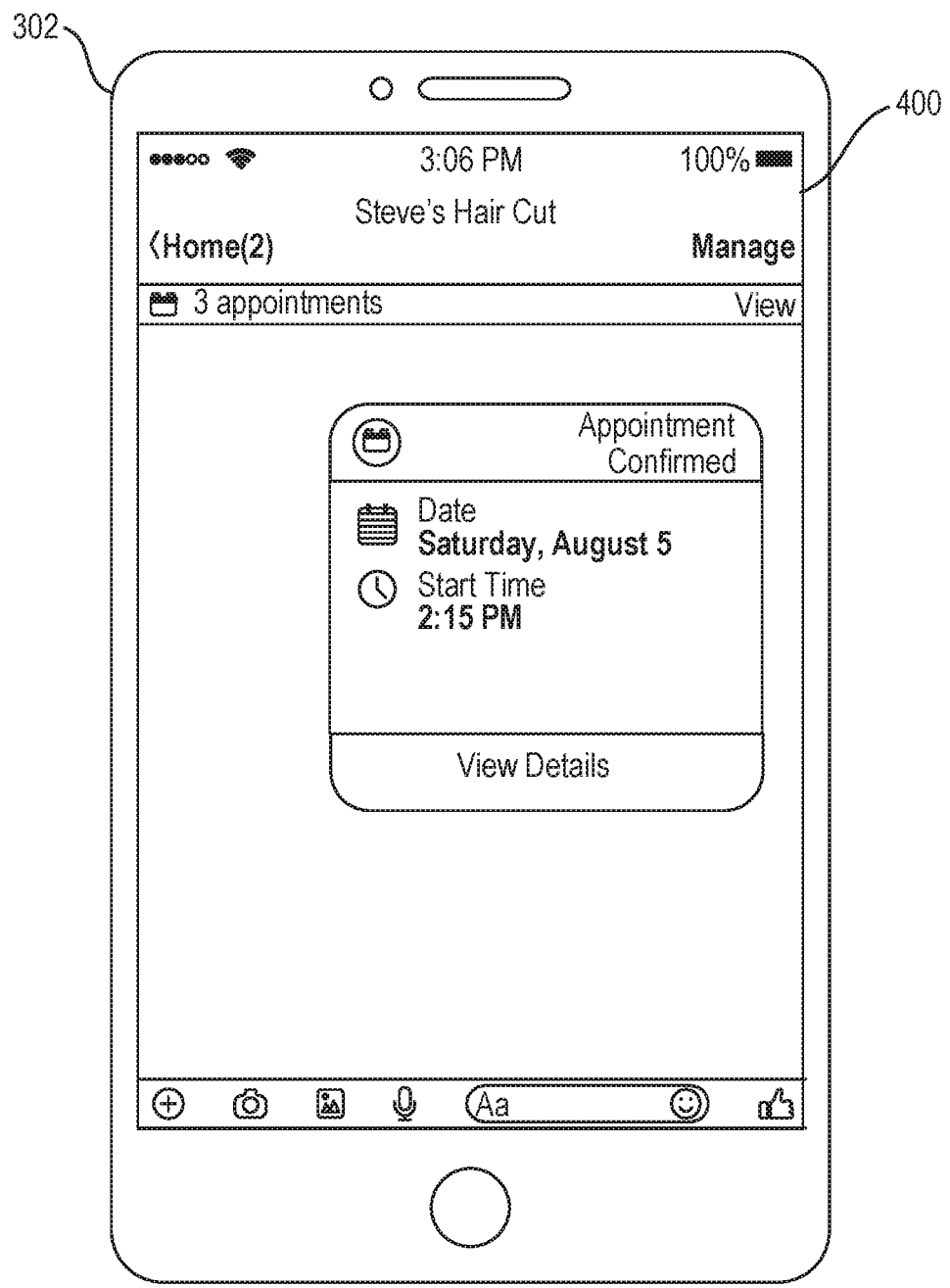

FIGS. 3A-4 illustrate example interfaces reflecting operation of the interaction management module 102, according to embodiments of the present technology. As shown in FIG. 3A, an interface 300 is presented on a user device 302 of a user. The interface 300 can present a page associated with an entity of a social networking system. For example, the interface 300 can be provided by an application of a social networking system running on the user device 302. In other examples not shown, the interface can be provided by other resources, such as a messaging application or other type of application through which the user and the entity can interact. In the example shown, the page presents a CTA 304. In the example shown, the CTA 304 is a "call now" CTA. In other examples, other CTAs can be presented. Upon selection of the CTA 304, the social networking system application providing the interface 300 can cause a phone application to be activated on the user device 302 to allow the user to perform an interaction relating to making a phone call to the entity. Utilizing the phone application, the user can complete the interaction, i.e., the phone call, with the entity and then can be returned to the social networking system application. Based at least in part on the interaction and other features relating to the interaction, such as a time duration of the phone call, a determination can be made that a particular transaction was engaged in or performed during the interaction. In this example, it is determined that the user performed a transaction relating to booking an appointment with the entity. The determination can be based on a machine learning model technique, as discussed above. A dialog or other interface element can be presented through the interface 300 to request that the user confirm that the transaction relating to booking an appointment with the entity, in fact, occurred. Upon receipt of confirmation, one or more follow up actions can be determined by a machine learning technique, as discussed above. The determination of follow up actions can be based at least in part on a type of the determined transaction.

As shown in FIG. 3B, in response to the transaction relating to booking an appointment with the entity, an option 306 to perform a corresponding follow up action is presented to the user. In particular, the follow up action is creation of a calendar reminder for the appointment. If the user selects the option 306 to perform the follow up action, the user is prompted through the interface 300 to provide information about the appointment, such as a date and time of the appointment. After provision of the information about the appointment, the calendar reminder can be generated and readied for delivery to the user at a selected amount of time before the appointment. When the selected amount of time arrives, a calendar reminder can be delivered to the user in an interface 400, as shown in FIG. 4. In addition, the calendar reminder can be provided to an administrator of the page involved in the appointment. In the example, shown, the interface 400 is provided by a messaging application that is different from the social networking system application that provided the interface 300. The interface 400 can provide various other functionalities, such as supporting a messaging session between the entity and the user and providing an indication of a total number of appointments between the user and the particular entity or a total number of appointments between the user and various entities, to name some examples. While the foregoing discussion relates to various examples, many variations of the present technology are possible.

FIG. 5A illustrates an example first method 500 for providing follow up actions, according to an embodiment of the present technology. It should be understood that there can be additional, fewer, or alternative steps performed in similar or alternative orders, or in parallel, based on the various features and embodiments discussed herein unless otherwise stated.

At block 502, the example method 500 can determine an interaction involving a user and an entity based on selection of a call to action (CTA). At block 504, the example method 500 can determine one or more follow up actions. At block 506, the example method 500 can cause presentation of an option for selecting the one or more follow up actions. Other suitable techniques that incorporate various features and embodiments of the present technology are possible.

Figure 5B:
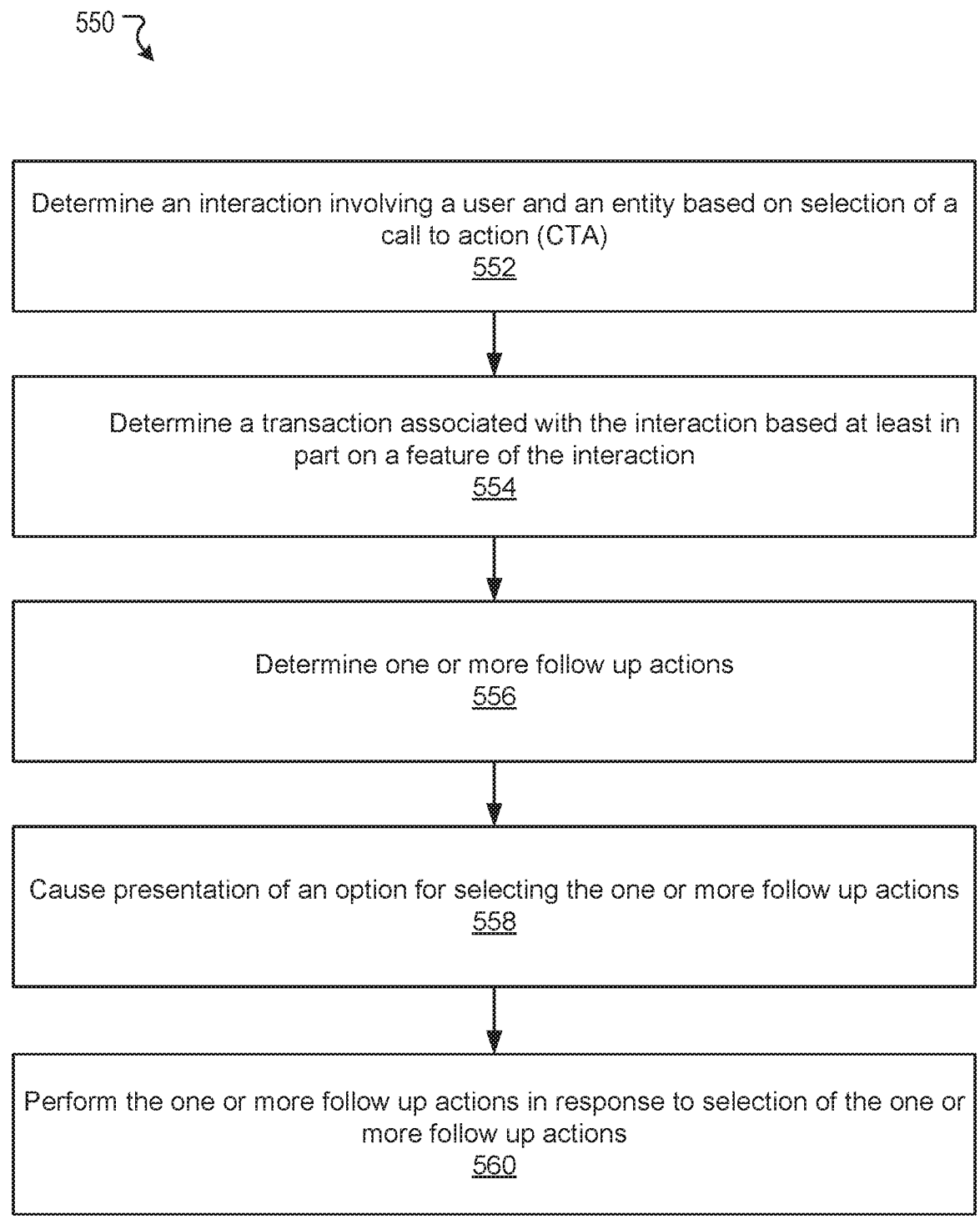
FIG. 5B illustrates an example second method, according to an embodiment of the present technology.

FIG. 5B illustrates an example second method 550 for providing follow up actions, according to an embodiment of the present technology. It should be understood that there can be additional, fewer, or alternative steps performed in similar or alternative orders, or in parallel, based on the various features and embodiments discussed herein unless otherwise stated.

At block 552, the example method 550 can determine an interaction involving a user and an entity based on selection of a call to action (CTA). At block 554, the example method 550 can determine a transaction associated with the interaction based at least in part on a feature of the interaction. At block 556, the example method 550 can determine one or more follow up actions. At block 558, the example method 550 can cause presentation of an option for selecting the one or more follow up actions. At block 560, the example method 550 can perform the one or more follow up actions in response to selection of the one or more follow up actions. Other suitable techniques that incorporate various features and embodiments of the present technology are possible.

It is contemplated that there can be many other uses, applications, features, possibilities, and/or variations associated with various embodiments of the present technology. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present technology can learn, improve, and/or be refined over time.

Social Networking System—Example Implementation

Figure 6:
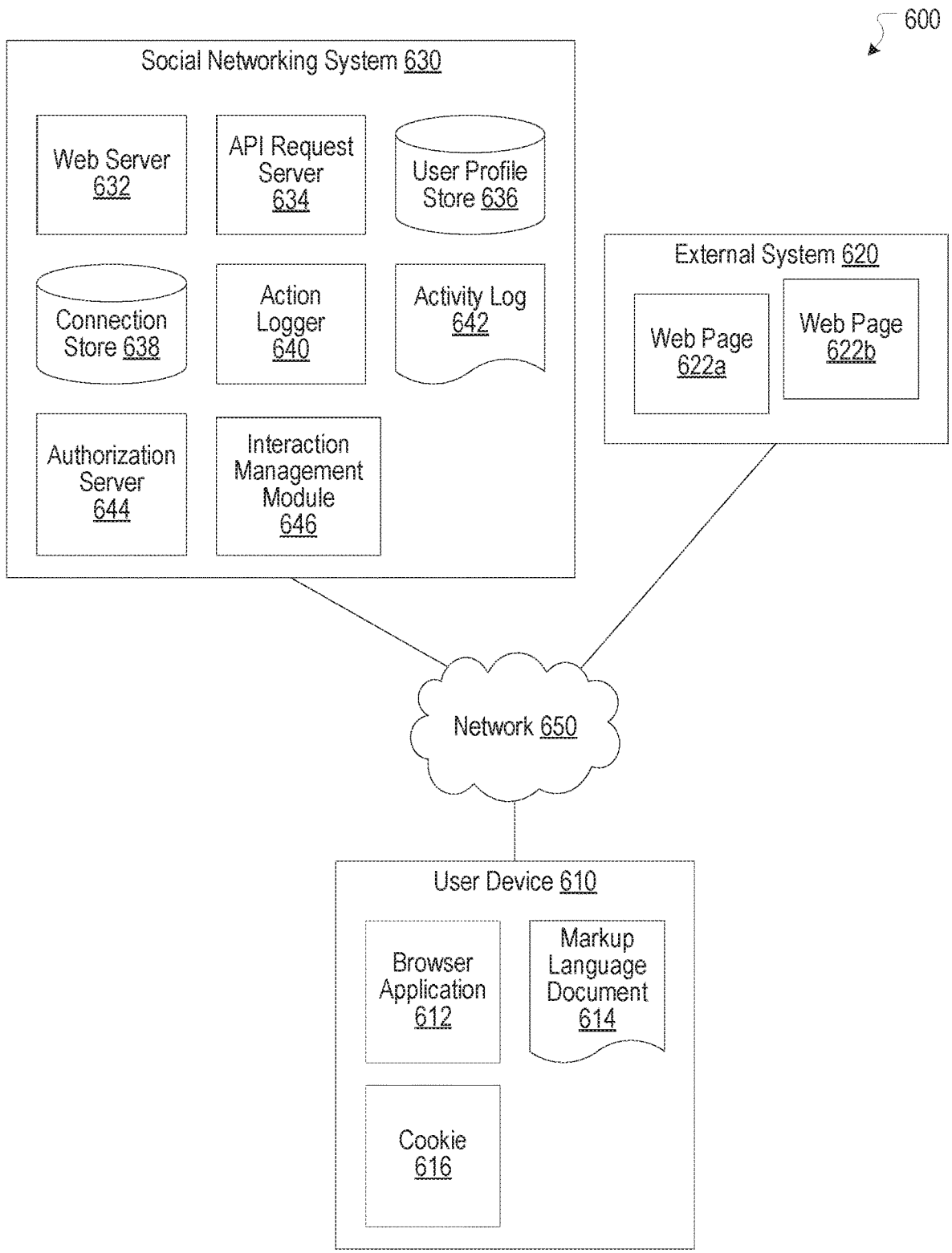
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an interaction management module 646. The interaction management module 646 can be implemented with the interaction management module 102, as discussed in more detail herein. In some embodiments, one or more functionalities of the interaction management module 646 can be implemented by the user device 610.

Hardware Implementation

Figure 7:
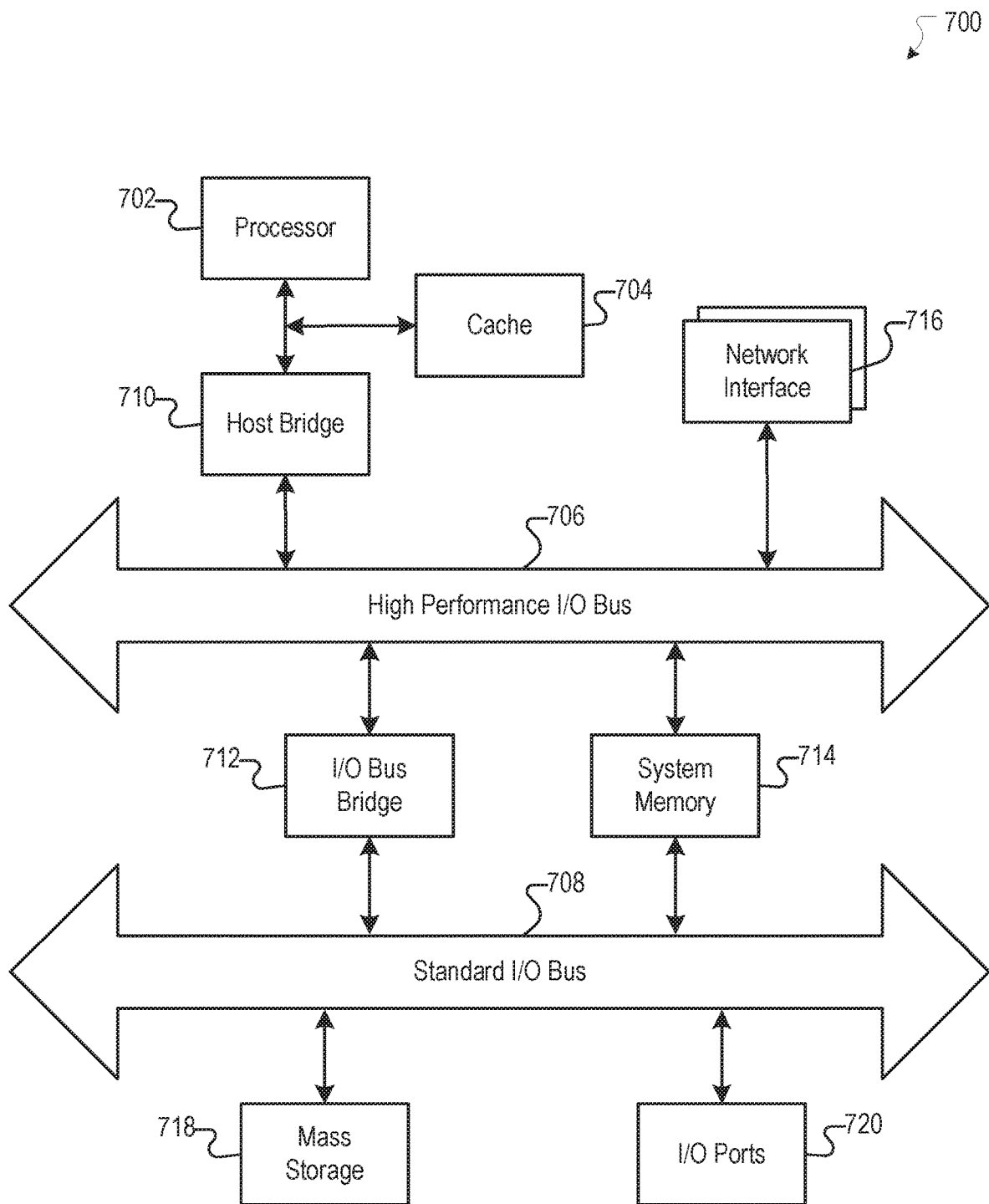
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
   determining, by a computing system, an interaction involving a user of a system and an entity based on selection of a call to action (CTA) on the system through which the entity is represented by a page, wherein the determining an interaction comprises predicting a transaction associated with the interaction has been performed based on a machine learning model trained to determine a likelihood that transactions associated with interactions have been performed;
   providing, by the computing system, a request for the user to confirm that the transaction was performed;
   determining, by the computing system, one or more follow up actions associated with the interaction; and
   causing, by the computing system, presentation of an option for selecting the one or more follow up actions.

2. The computer-implemented method of claim 1, wherein the selection of the CTA is performed through a social networking system and the interaction is performed external to the social networking system.

3. The computer-implemented method of claim 2, wherein the interaction is a phone call made by the user to the entity.

4. The computer-implemented method of claim 3, wherein the transaction is between the user and the entity.

5. The computer-implemented method of claim 1, wherein the predicting the transaction
   is based at least in part on a feature of the interaction.

6. The computer-implemented method of claim 5, further comprising:
   performing the one or more follow up actions in response to selection of the one or more follow up actions.

7. The computer-implemented method of claim 5, wherein the interaction is a phone call from the user to the entity, the feature of the interaction is a time duration of the phone call, and the one or more follow up actions relates to a calendar reminder.

8. The computer-implemented method of claim 5, wherein the predicting the transaction is further based on training data for the machine learning model that includes time durations of the interactions and associated labels indicating transactions that were performed during the interactions.

9. The computer-implemented method of claim 1, wherein the determining the one or more follow up actions is based on a second machine learning model.

10. The computer-implemented method of claim 1, wherein the option for selecting the one or more follow up actions is presented through a first application and information relating to the one or more follow up actions is presented through a second application.

11. A system comprising:
    at least one hardware processor; and
    a memory storing instructions that, when executed by the at least one processor, cause the system to perform:
    determining an interaction involving a user of a system and an entity based on selection of a call to action (CTA) on the system through which the entity is represented by a page, wherein the determining an interaction comprises predicting a transaction associated with the interaction has been performed based on a machine learning model trained to determine a likelihood that transactions associated with interactions have been performed;

providing a request for the user to confirm that the transaction was performed;

determining one or more follow up actions associated with the interaction; and causing presentation of an option for selecting the one or more follow up actions.

12. The system of claim 11, wherein the selection of the CTA is performed through a social networking system and the interaction is performed external to the social networking system.

13. The system of claim 12, wherein the interaction is a phone call made by the user to the entity.

14. The system of claim 13, wherein the transaction is between the user and the entity.

15. The system of claim 11, wherein the predicting the transaction
is based at least in part on a feature of the interaction.

16. A non-transitory computer readable medium including instructions that, when executed by at least one hardware processor of a computing system, cause the computing system to perform a method comprising:

determining an interaction involving a user of a system and an entity based on selection of a call to action (CTA) on the system through which the entity is represented by a page, wherein the determining an interaction comprises predicting a transaction associated with the interaction has been performed based on a machine learning model trained to determine a likelihood that transactions associated with interactions have been performed;

providing a request for the user to confirm that the transaction was performed;

determining one or more follow up actions associated with the interaction; and causing presentation of an option for selecting the one or more follow up actions.

17. The non-transitory computer readable medium of claim 16, wherein the selection of the CTA is performed through a social networking system and the interaction is performed external to the social networking system.

18. The non-transitory computer readable medium of claim 17, wherein the interaction is a phone call made by the user to the entity.

19. The non-transitory computer readable medium of claim 18, wherein the transaction is between the user and the entity.

20. The non-transitory computer readable medium of claim 16, wherein the predicting the transaction
is based at least in part on a feature of the interaction.

* * * * *